(12) United States Patent
Sankararaman et al.

(10) Patent No.: US 12,717,951 B1
(45) Date of Patent: Aug. 25, 2026

(54) DYNAMIC THREAT DETECTION FOR DIVERSE DATABASES

(71) Applicant: Amazon Technologies, Inc., Seattle, WA (US)

(72) Inventors: Abishek Sankararaman, San Francisco, CA (US); Sriram Manohar, Seattle, WA (US); Joseph Skinner, Renton, WA (US); Saumya Gaurang Shah, Santa Clara, CA (US); Balakrishnan Narayanaswamy, San Jose, CA (US); Farnam Mohasseb, North Vancovuer (CA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 67 days.

(21) Appl. No.: 18/750,649

(22) Filed: Jun. 21, 2024

(51) Int. Cl.
*G06F 21/62* (2013.01)

(52) U.S. Cl.
CPC .. *G06F 21/6218* (2013.01); *G06F 2221/2135* (2013.01)

(58) Field of Classification Search
None
See application file for complete search history.

(56) References Cited

U.S. PATENT DOCUMENTS

| | | | | |
|---|---|---|---|---|
| 10,445,311 | B1 * | 10/2019 | Saurabh | H04L 63/1425 |
| 2008/0295172 | A1 * | 11/2008 | Bohacek | H04L 63/1416 726/23 |
| 2020/0274894 | A1 * | 8/2020 | Argoeti | H04L 63/1433 |
| 2021/0073819 | A1 * | 3/2021 | Hernandez | G06Q 20/4016 |

* cited by examiner

*Primary Examiner* — Brandon Hoffman
(74) *Attorney, Agent, or Firm* — K&L Gates LLP

(57) ABSTRACT

Systems and techniques for database threat detection are described. First login data for a first database that includes a first aggregation key may be received. A first counter that tracks first events associated with the first database may be determined. A first value of the first counter associated with at least the first aggregation key may be determined. A first feature value associated with the first aggregation key may be determined using the first value. An aggregated anomaly detection score may be determined by combining the first anomaly detection score and a plurality of other anomaly detection scores. A determination may be made that the first login data represents anomalous database activity for the first database by comparing the aggregated anomaly detection score to a threshold anomaly detection score. First output data indicating that the first login data represents anomalous database activity for the first database may be generated.

20 Claims, 11 Drawing Sheets

302

```
aggregation_keys = {"instance_resource_id",
                    "db_name",
                    "auth_method",
                    "ssl",
                    "role_name",
                    "client_ip_address",
                    "application_name"}
```

304

```
counters = {"bad_db_name",
            "total_auth_failed",
            "authorized",
            "not_authorized",
            "bad_db_permission"}
```

| Counter | Value | what it tells us |
|---|---|---|
| authorized | integer | successful authorization counter |
| not_authorized | integer | failed authorization counters (wrong password) |
| bad_db_name_count | integer | a succesful database connection was made however dbname passed was not in the DB? |
| bad_id_count | integer | a succesful database connection was made however connection was using OID to connect to db. OID was not in DB (postgres specific) |
| bad_db_permission_count | integer | a succesful connection attempt however the user does not have access to the DB so is rejected. (no other counters increment) |
| bad_connection_packet_count | integer | increments when a connection attempt is made but a cancel or bad packet is sent |
| bad_startup_packet_count | integer | connection attempt is made however nothing is ever passed (no connection string) no increments to anything besides a bad count. |
| total_auth_failed | integer | total auth failed = not_authorized + connections where no password was passed |

```
{
instance_resource_id = “db-ABCDEFGHIJKLMNOPQ”
db_name = “DB123”
auth_method = “MD5”
ssl = “TLSv1_3”
role_name = “ABISANKA”
client_ip_address = “192.168.0.0”
application_name = “APP1”
}
```

| | Counter 1 Sum of not_authorized connections | | | | ... Counter_N |
|---|---|---|---|---|---|
| Time scale(s) | 5 | 10 | 30 | 120 | ... |
| 1: role_name== ABISANKA | 1 | 6 | 8 | 14 | |
| 2: client_IP_address== IP# and auth_method == MD5 | 0 | 1 | 4 | 4 | |
| ⋮ | | | | | |
| M: application_name == APP1 | 0 | 3 | 37 | 117 | |

FIG. 4A $$\mathbf{w}_{\text{agg}} = (w^{(\text{agg})}_{\text{instance-id}}, w^{(\text{agg})}_{\text{role-name}}, \cdots, w^{(\text{agg})}_{\text{application}}),$$

$$\mathbf{w}_{\text{counter}} = (w^{(\text{counter})}_{\text{auth}}, w^{(\text{counter})}_{\text{not-auth}}, \cdots, w^{(\text{counter})}_{\text{bad-db-name}}),$$

$$\mathbf{w}_{\text{time-scale}} = (w^{(\text{time-scale})}_{1}, w^{(\text{time-scale})}_{10}, \cdots, w^{(\text{time-scale})}_{240})$$

such that $p^{(\text{agg})}_{\text{instance-id}} = \text{Softmax}(\mathbf{w}_{\text{agg}})_{\text{instance-id}}$

440

$$\boldsymbol{w}^*_{agg}, \boldsymbol{w}^*_{counter}, \boldsymbol{w}^*_{time-scale}$$

$$= \arg_{\boldsymbol{w}^*_{agg}, \boldsymbol{w}^*_{counter}, \boldsymbol{w}^*_{time-scale}} \min \sum_{LoginEntry} S_{LoginEntry\ at\ database\ cluster}(\boldsymbol{w}^*_{agg}, \boldsymbol{w}^*_{counter}, \boldsymbol{w}^*_{time-scale})$$

$$+ \lambda_1 KL\left(\boldsymbol{q}_{agg} \| Softmax(\boldsymbol{w}_{agg})\right) + \lambda_2 KL\left(\boldsymbol{q}_{counter} \| Softmax(\boldsymbol{w}_{counter})\right)$$

$$+ \lambda_3 KL\left(\boldsymbol{q}_{time-scale} \| Softmax(\boldsymbol{w}_{time-scale})\right)$$

$\mathbf{q}_{\text{agg}}, \mathbf{q}_{\text{counter}}, \mathbf{q}_{\text{time-scale}}$ Prior distributions for db over the aggregation keys and counters (for divergence minimization)

FIG. 4D

DYNAMIC THREAT DETECTION FOR DIVERSE DATABASES

BACKGROUND

Databases, and particularly cloud-based databases, may vary in terms of configurations, security postures, workload, data sensitivity, industry requirements, service level agreements, etc. For example, in terms of security postures, databases may use different encryption protocols, database engines, access controls, and/or network isolation approaches. Workload patterns can vary based on factors like transaction volume, query complexity, applications accessing a given database, etc. Databases may be the subject of malicious activity such as unauthorized data exfiltration and/or unauthorized manipulation of stored data.

BRIEF DESCRIPTION OF DRAWINGS

FIG. 3A depicts example aggregation keys and counters that may be used by the dynamic threat detection system, in accordance with various aspects of the present disclosure.

FIG. 3B provides additional information about the example counters of FIG. 3A, in accordance with various aspects of the present disclosure.

FIG. 4A depicts example aggregation keys for a login event and depicts examples of feature extraction, in accordance with various aspects of the present disclosure.

FIG. 4D depicts an unsupervised machine learning technique that may be used to dynamically update weights of the various feature values according to prior knowledge about the database and current usage patterns of the database.

DETAILED DESCRIPTION

Figure 1:
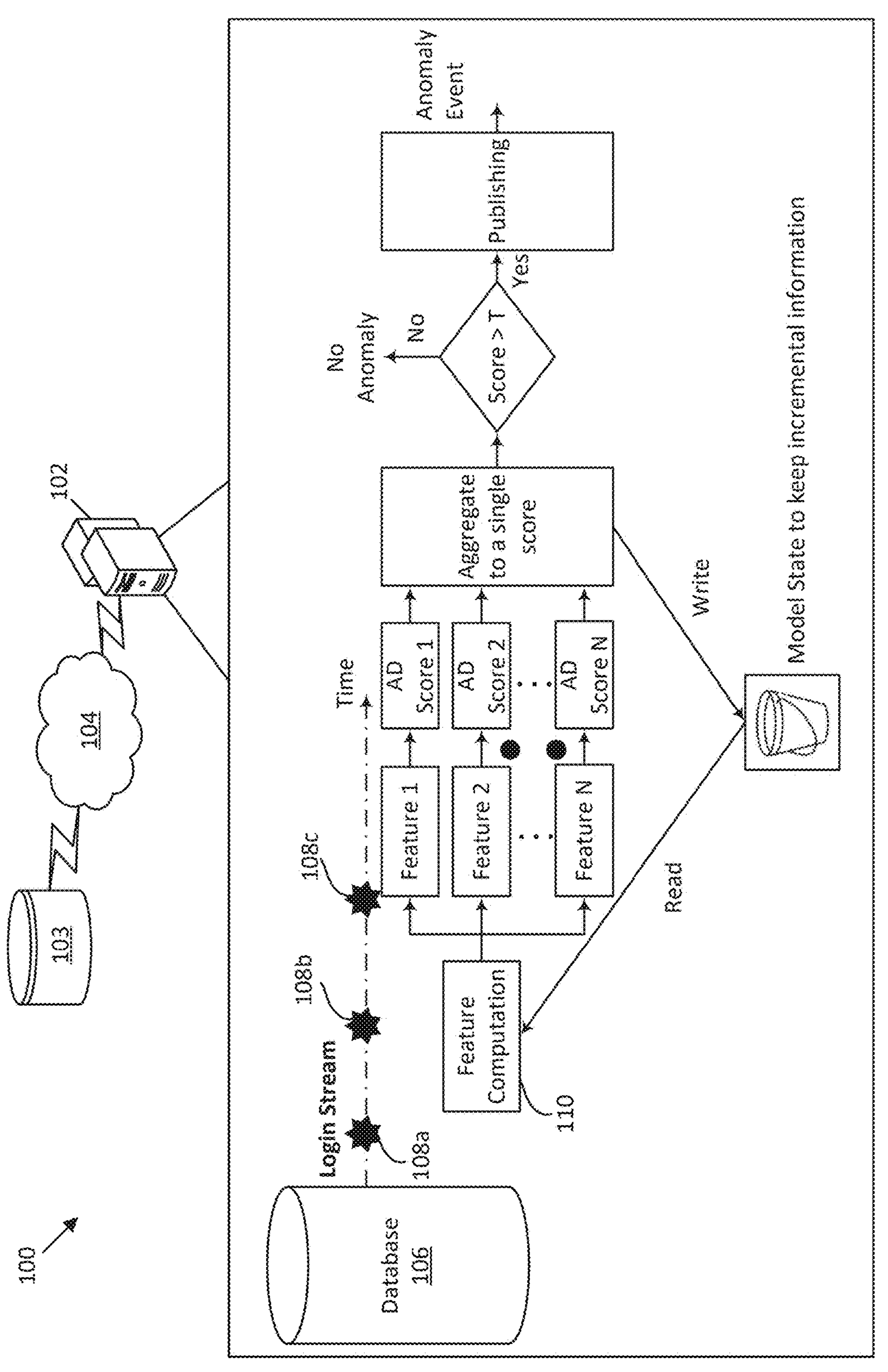
FIG. 1 is a block diagram illustrating a dynamic threat detection system for diverse and changing databases, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Cloud-based databases may store sensitive and/or proprietary data and/or may have a variety of different access controls to control which users and/or other systems have access to data stored by the database. Malicious actors, malfunctioning systems, systems with outdated login credentials, etc., may attempt unauthorized access to secure databases. Some of these unauthorized access events may be non-malicious, while other attempts may be related to malicious activity such as information theft, impermissible data exfiltration, unauthorized data modifications to data stored by the databases, etc.

Detection of anomalous database login attempts (e.g., such as those coming from an attacker) for a single database having a relatively static workload may be relatively simple. For example, a machine learning model may be trained using supervised learning (e.g., login attempts labeled with anomalous/non-anomalous labels) to predict when a given login entry is likely to be anomalous. However, what may be anomalous for one database may be commonplace, permissible activity for another database. For example, a first database may experience 10 login attempts per day, on average, while a second database may experience 10,000 login attempts per day on average. Ten unauthorized login attempts from a given IP address in a single day for the second database may be relatively non-anomalous, while the same set of circumstances may be highly anomalous for the first database. Additionally, the distribution of login events may shift over time, even for a single database. For example, the user base may grow exponentially over time. In another example, a database may be moved from a test environment (in which there are a relatively large number of different login attempts per day) to a production environment (in which the number of different login attempts per day may look significantly different). Further, collection of labeled samples for training a supervised machine learning model for anomalous database activity may be difficult, time-consuming, and/or cost prohibitive. Since database attacks and/or other anomalous database activity may be rare, collecting a representative training set may be difficult.

Accordingly, using the supervised machine learning approach described above, a single model may need to be trained and deployed for each different database. Additionally, these models may need to be retrained over time to account for distribution shift. Such solutions may not be scalable due to the large compute overhead associated with deployment and training of a large number of different models depending on the workloads and shifting characteristics of the various databases being monitored.

To overcome these technical challenges, described herein are anomaly detection techniques that may operate on database login event streams that work for any number of diverse databases (such as those typically deployed in cloud-based environments). Unlike conventional approaches, the dynamic threat detection systems and techniques described herein operate efficiently at scale without using ground truth labels (supervised learning), making the various systems and techniques adaptable to a wide array of security and database environments. In various examples described herein, the dynamic threat detection systems and techniques learns rules for detecting anomalies (using machine learning-based approaches) that are workload dependent. The dynamic threat detection systems tunes itself in an online streaming fashion as the workload for any given database changes over time. Accordingly, the dynamic threat detection systems and techniques described herein work with any number of diverse databases while being robust to distribution shift, without using ground truth labels, and while being efficiently implementable and scalable for any desired workload.

The dynamic threat detection systems and techniques described herein can process login events at real time from any number (e.g., millions) of databases running diverse workloads. The system's accuracy is consistent across databases of diverse workloads in terms of security posture, workload, data sensitivity, and industry requirements. In various examples, the variation in security posture across these databases may stem from differences in encryption protocols, database engines, access controls, and network isolation. Workload patterns can vary based on factors like transaction volume, query complexity, the nature of applications accessing the database, etc. Additionally, the sensitivity of data stored in these databases can vary based on industry regulations, privacy concerns, and the nature of the information being stored.

As described in further detail below, the dynamic threat detection systems and techniques described herein consume a stream of login data (e.g., login event logs) from different databases. This login data includes the login attempt attributes (aggregation keys) such as database names, role name (e.g., a role and/or role title for a user), internet protocol (IP) address, autonomous system number (ASN), organization (e.g., metadata that specifies the organization that owns the ASN), application name, authentication method, authorization mechanism, exit code (succeeded/failed, etc.), among others. A number of unique features may be determined, with each feature comprising a unique combination of at least one aggregation key, a counter, and a time scale. Feature values (e.g., values of the counter associated with a given feature) may be extracted for these various aggregation keys over time. Each feature value may be transformed into a respective anomaly detection score (e.g., by dividing the observed feature value by a maximum value for that feature observed in historical data). For example, the anomaly detection scores may be computed from feature values using counters tracking the number of successful and failed connections over the various different aggregation keys and over various time scales through sketches. Sketches helps to preserve the accuracy of the counts and quantiles while the memory may be kept bounded with O(1) storage.

In the inference phase, given a login entry, the dynamic threat detection systems and techniques described herein determines a respective feature score for each unique feature (e.g., a unique combination of one or more aggregation keys, a counter, and a time scale) through multiple adaptive rules. The feature scores are transformed into respective anomaly detection scores for each feature and these per-feature anomaly detection scores are aggregated into a final anomaly detection score using rules learned using a machine-learning based approach that employs the guiding principle that database anomalies are rare events. Each rule has a dynamic weight that updates over time proportional to the rate at which anomalies are detected. This design of keeping dynamic weights also enables the dynamic threat detection systems and techniques described herein to be adaptive to distribution changes that typically occur at databases—what was anomalous event for a database in the past need not be now, or vice-versa. For example, for a database open to the Internet, seeing new public IP addresses might be commonplace—while new public IP addresses may be unusual for a database whose access is scoped down.

FIG. 1 is a block diagram illustrating a dynamic threat detection system 100 for diverse and changing databases, according to various embodiments of the present disclosure.

In various examples, one or more computing devices 102 may implement the dynamic threat detection system 100. In examples where more than one computing device 102 implements the dynamic threat detection system 100, the different computing devices may communicate with one another over a network 104. For example, a remote computing device (and/or remote system of computing devices) may communicate with dynamic threat detection system 100 via an application programming interface (API) as a cloud-based service. For example, login streams may be received by the dynamic threat detection system 100 from a remote database (e.g., database 106).

In various examples, each of the one or more computing devices 102 used to implement dynamic threat detection system 100 may comprise one or more processors. The one or more computing devices 102 used to implement dynamic threat detection system 100 may be configured in communication with at least one non-transitory computer readable memory 103 ("memory 103"). In at least some examples, the one or more computing devices used to implement dynamic threat detection system 100 may communicate with memory 103 over network 104. The memory 103 may store computer-readable instructions that, when executed by at least one processor of the one or more computing devices implementing dynamic threat detection system 100, may be effective to program the one or more processors to perform the various anomalous rights detection techniques and/or execute the various algorithms described herein.

In various examples, network 104 is a wide area network, such as the Internet, while in other embodiments, the network 104 is a local area network (LAN) over which requests may be received. In some further embodiments, network 104 is a combination of the Internet and a LAN.

The dynamic threat detection system 100 may receive a login stream from any number of different databases. In the example of FIG. 1, the dynamic threat detection system 100 receives a login stream from database 106 that includes login events 108*a*, 108*b*, 108*c*, etc. Although only a single database 106 is depicted for simplicity, it should be appreciated that the dynamic threat detection system 100 may perform the described techniques for any number of databases and that the anomaly detection techniques may be adaptable to the unique security postures, workloads, data sensitivity, and/or industry requirements (e.g., service level agreements (SLAs)) of the respective databases. In some examples, login events 108*a*, 108*b*, 108*c* may be real time login events, while in other examples, the login stream may include a log of login events that are collected over a given time period (e.g., over a 1 minute period).

The example of FIG. 1 depicts processing for login event 108*b*, although it should be appreciated that this processing may be repeated for each login event. Feature computation 110 may be used to extract a number of unique features from the login event 108*b*. For example, the dynamic threat detection system 100 may include instructions for parsing the login event 108*b* to extract various information about different aggregation keys. The individual features (e.g., Feature 1, Feature 2, . . . , Feature N) may each be a unique combination of one or more aggregation keys, a counter, and a time scale, as described in further detail below. Each feature may be associated with a feature value, which is the observed counter value over the feature's aggregation key(s), at the feature's time scale. The feature values may be used to calculate anomaly detection scores (e.g., AD scores 1, 2, . . . , N) for each of the different features. These anomaly detection scores may be combined into a single, aggregated anomaly detection score using a weighted, linear combination of the various anomaly detection scores as described below in reference to FIG. 4C. The weights are dynamically updated over time proportional to the rate at which anomalies are detected (as described below in reference to FIG. 4D). The aggregated anomaly detection score may be compared to a threshold anomaly detection score and if the aggregated anomaly detection score exceeds the threshold anomaly detection score the login event 108*b* may be detected as anomalous.

Various output data may be generated in response to detection of an anomalous login event (e.g., anomalous database activity). For example, access to the database by the particular IP address, user account, role, application ID, etc., may be disabled, an alert may be generated, the account may be flagged for investigation, etc. The aggregated score and model state may be written to non-transitory computer-readable memory so that the model state (e.g., the dynamic weights used to aggregate the feature values) may be updated dynamically over time. For example, upon detection of an anomalous login event by a particular application, database access by the particular application may be programmatically suspended pending investigation of the anomalous database activity pertaining to the application.

Figure 2:
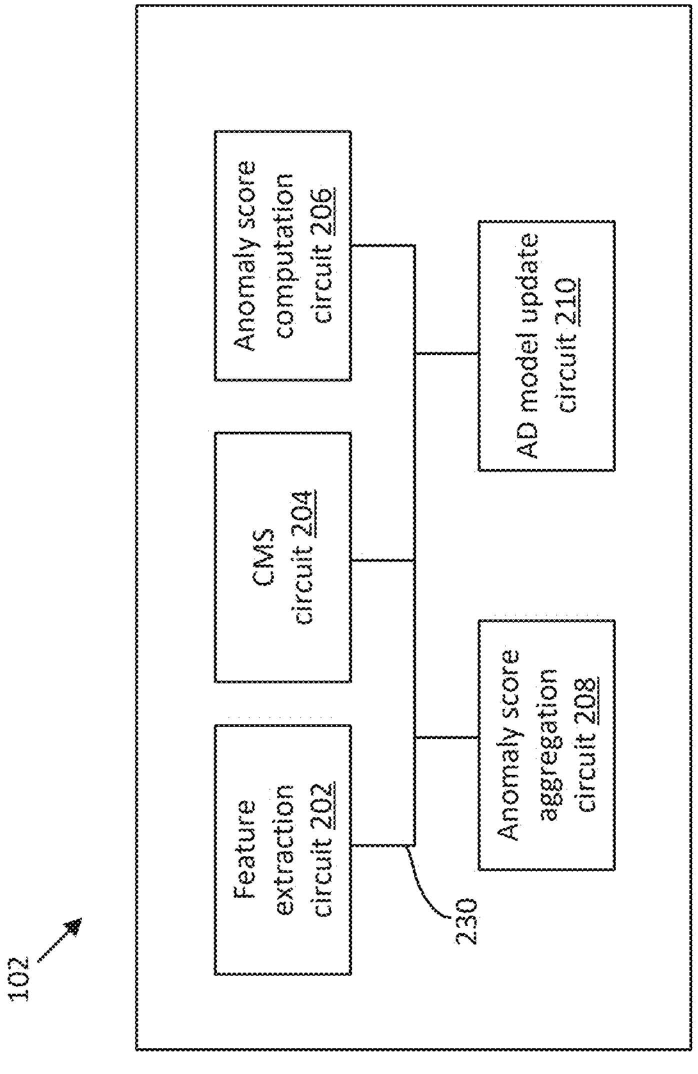
FIG. 2 depicts an example diagram of an apparatus that may be used to detect threats for diverse databases, in accordance with various embodiments of the present disclosure.

FIG. 2 depicts an example diagram of computing device(s) 102 that may be used to detect threats for diverse databases, in accordance with various embodiments of the present disclosure. Although the various operations described herein in reference to the dynamic threat detection system 100 may be implemented using software, hardware, or some combination thereof, FIG. 2 represents a hardware-based implementation of the dynamic threat detection system 100 that may be implemented using hardware and/or computer-executable instructions. In various examples, specific hardware components are described that can be used to implement various functions of the different circuits described in FIG. 2. However, instead of, or in addition to, using such application specific components (e.g., application specific integrated circuits (ASICs)), programmable circuits (e.g., field programmable gate arrays (FPGAs) and/or other processing circuits) may be used to implement the various operations and/or components of FIG. 2.

In the example implementation depicted in FIG. 2, the computing device(s) 102 may include a feature extraction circuit 202, a CountMinSketch circuit 204, an anomaly score computation circuit 206, an anomaly score aggregation circuit 208, and/or an anomaly detection model update circuit 210.

Feature extraction circuit 202 may comprise a combinatorial circuit comprising one or more multiplexers for determining the values of various aggregation keys and/or counters over pre-selected time scales (as described in further detail below). The feature values associated with each distinct feature may be stored in one or more registers and/or caches of the feature extraction circuit 202.

The CMS circuit 204 may access the probabilistic databases (e.g., CMS data structure 402 of FIG. 4B) to determine the maximum feature values (and/or quantized representations thereof) associated with each feature. The anomaly score computation circuit 206 may take individual feature values output by the feature extraction circuit 202 and the maximum feature values output by the CMS circuit 204 and may include a multiplier circuit effective to divide the per-feature feature values (observed values) by the corresponding per-feature maximum feature value (determined over a past time period) to determine the anomaly detection scores. These operations are described in further detail below. The multiplier circuit of the anomaly score computation circuit 206 may perform division by multiplying the feature value by the inverse of the maximum feature value.

Anomaly score aggregation circuit 208 may include one or more adder circuits, multiplier circuits, and/or accumulators (for storing running sums). The anomaly score aggregation circuit 208 may use a multiplier circuit to multiply the probabilities with the per-feature scores $S_{x,y,z}$ as described in reference to FIG. 4C. The adder circuits may sum the different products together and keep the running total to determine the aggregated anomaly detection score $S_{Login\text{-}Entry}$. In various examples, the anomaly score aggregation circuit 208 may comprise a comparator to compare the aggregated anomaly detection score $S_{Login\text{-}Entry}$ to a threshold value. The comparator may receive the threshold value from a register storing the threshold anomaly detection score and may receive the aggregated anomaly detection score $S_{Login\text{-}Entry}$ from the same register, a different register, or from the accumulator of the anomaly score aggregation circuit 208.

AD model update circuit 210 may comprise one or more adder circuits, multiplier circuits, accumulators, and/or ASICs and/or FPGAs. The adder and/or accumulator circuits may be used to perform the addition operations described below in reference to the loss function 440. The multiplier(s) may be used to multiply the Kullback-Leibler (KL) divergence values of loss function 440 by the weight parameters 2. The ASICs and/or FPGAs may be used to determine the KL divergence values between the prior distributions and the probability distributions of the weights w, as described below in reference to FIG. 4D. Interconnect 230 may be an electrical interconnect (e.g., one or more traces, vias, buses, etc.) that may be used to communicate between the different components of the computing device(s) 102.

FIG. 3A depicts an example of aggregation keys 302 and counters 304 that may be used by the dynamic threat detection system, in accordance with various aspects of the present disclosure. For example, for a given login event, the aggregation keys may include an instance resource identifier, a database name identifier, an authentication method, the IP address of the client, an application identifier, etc. Counters 304 may be examples of counters that may be incremented across different combinations of aggregation keys and/or time scales, as described in further detail below. Each feature extracted by the dynamic threat detection system 100 may be distinct from each other feature and may include a unique combination of one or more aggregation keys, a counter, and a time scale (selected from among multiple time scales). The feature value for a given feature may be the counter value (over the feature's time scale).

FIG. 3B provides additional information about example counters 306 (including the example counters 304 of FIG. 3A), in accordance with various aspects of the present disclosure. As shown, an "authorized" counter tracks the number of successful authorizations over time, while the not_authorized counter tracks the failed authorization attempts over time. As described in further detail below, the feature values for each feature may represent selected counter values for individual aggregation keys over different time scales or selected counter values for pairs of aggregation keys over different time scales. Any number of different time scales may be considered, according to the desired implementation. By way of illustrative example, let it be assumed that five time scales are used: 5 minutes, 10 minutes, 30 minutes, 120 minutes, and 240 minutes. However, any number of time scales (and any values for these different time scales) may be used in accordance with desired implementation.

FIG. 4A depicts example aggregation keys for a login event and depicts examples of feature extraction, in accordance with various aspects of the present disclosure. In the example of FIG. 4A there are seven distinct aggregation keys 480, with each aggregation key being associated with a value. For example, the aggregation key instance_resource_id has the value "db-ABCDEFGHIJKLMNOPQ".

Let it be assumed, for the sake of the example, that there are five distinct counters 304 (of which the sum of not_authorized connections is an illustrated example of one of the five counters 304 in FIG. 4A). Let it also be assumed that there are five different time scales being tracked (e.g., 5 minutes, 10 minutes, 30 minutes, 120 minutes, and 240 minutes (although the 240 minute time scale is not shown in FIG. 4A)).

In such a case, there may be 28×5×5 distinct features. The 28 comes from the seven individual aggregation keys and pairwise combination of the seven aggregation keys $$\left(\text{e.g., } 28 = 7 + \binom{7}{2}\right),$$

the first five comes from the number of counters, and the second five comes from the number of different time scales selected. Accordingly, in this example, there are 28×5×5=700 unique features, each with its own feature value.

In the example of FIG. 4A, for the single aggregation key feature role_name==ABISANKA, the count for selected counter 1 (a counter for the sum of not_authorized connections) is 1 for the 5 minute time scale, 6 for the 10 minute time scale, 8 for the 30 minute time scale, and 14 for the 120 minute time scale (accordingly for the single aggregation key and the selected counter (Counter 1), five different feature values are determined (one for each of the five time scales). Similarly, for the pairwise feature client_IP_address==192.168.0.0 and auth_method==MD5, the count for counter 1 (the sum of not_authorized connections) is 0 for the 5 minute time scale, 1 for the 10 minute time scale, 4 for the 30 minute time scale, and 4 for the 120 minute time scale.

In various examples, in order to compute the anomaly detection score (e.g., the individual AD score) for each observed feature value, each feature value (e.g., the count value for the 28×5×5 distinct features) may be divided by the maximum feature value of that feature (for the relevant time scale) over a past time period. The past time period may be a tunable hyperparameter of some past time period that is longer than any of the selected time scales. For example, the predetermined past time period may be 2 months or some other desired value. Since there are a large number of features for a single database (and since there may be multiple databases (e.g., millions of databases) being evaluated) storing a maximum value for each feature of each database in memory may be infeasible (due to storage and/or compute concerns). For example, if a particular IP address is associated with 7 unauthorized events over the past 30 minutes (a particular time scale), the maximum value may be the 30 minute window, over the past 2 months, during which the particular IP address was associated with the maximum number of unauthorized events (determined using the unauthorized event counter). Accordingly, a sliding-window approach (with the window size being the relevant time scale) may be employed over the 2 months to determine the maximum value.

Figure 4B:
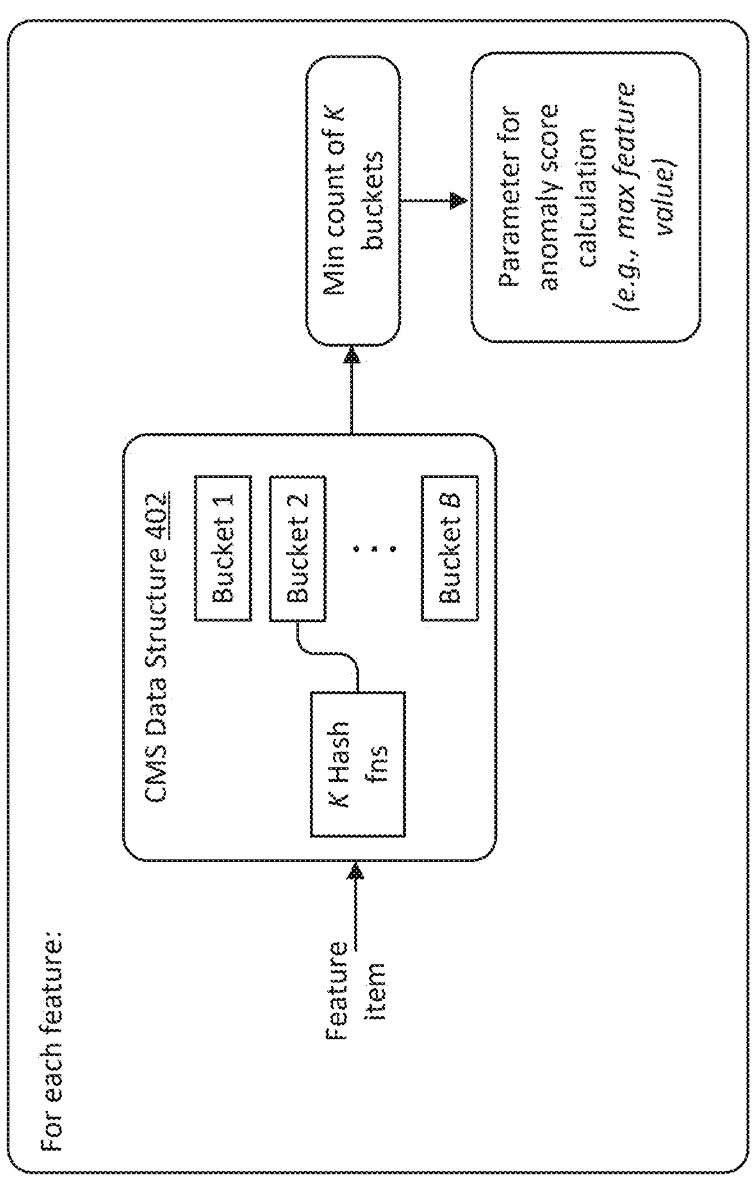
FIG. 4B depicts an example of a probabilistic data structure that may be used during feature value computation for efficiently scaling the dynamic threat detection system, in accordance with various aspects of the present disclosure.

Accordingly, FIG. 4B depicts an example of a probabilistic data structure that may be used during feature value computation for efficiently scaling the dynamic threat detection system, in accordance with various aspects of the present disclosure. An implementation challenge is to maintain a max feature value over the past time period for each of the different 28×5×5 features. Having a separate lookup dictionary for each seen unique item can become infeasible with respect to memory. To overcome this, FIG. 4B depicts usage of a CountMinSketch data-structure.

For each of the 28×5×5 features, a CMS data structure 402 may be maintained with B buckets and K hash functions. Given a feature of {IP-Address, Auth-Method, 30} and an input item of {192.168.0.0, MD5} (i.e., the particular values for the aggregation keys IP-Address and Auth-Method), each of the K different hash functions may output a bucket from 1 through to B in which the item {192.168.0.0, MD5} lies in. In order to update the counts, all of the buckets in the K hash-functions are updated. To infer the number of times the item {192.168.0.0, MD5} is seen, the smallest value (e.g., the minimum count) of the K buckets may be returned as the answer (e.g., as the maximum feature value). The anomaly detection score for each of the different 28×5×5 features may be computed by dividing the observed feature value by the maximum feature value which is looked up using the CMS data structure 402.

An alternate implementation option for determining feature values and anomaly detection scores is now described. Instead of directly using the counter value for a given feature as the feature value and dividing this observed feature value by the maximum feature value over the past time period (e.g., 2 months)—a single parameter model—a two parameter model may instead be used.

For example, for each feature, the mean and variance of the log-feature value may be tracked. For example, for a feature (IP_Address, Auth method, Time-scale) and the feature item (192.168.0.0, MD5, 30), the mean and variance of the log-feature value may be tracked. The log of the feature value may be used to keep the scoring robust to small fluctuations. Given that the observed log-feature value is log (1+24), and the parameters are $\mu_{iphash,md5,30}$ and $\sigma_{iphash,md5,30}$, the anomaly detection score may given by:

$$S_{(IP,auth,30)} = \min(CDF - \text{Gaussian}(\log(1+24), \mu_{192.168.0.0,md5,30}, \sigma_{iphash,md5,30}), CDF - \text{Exponential}(\log(1+24), \mu_{192.168.0.0,md5,30}))$$

The intuition for using the minimum stems from the following observations: 1) if the variance σ is very small, then tiny fluctuations around the mean lead to very large anomaly detection scores; and 2) for features that have a small mean, but large variances, exponential distribution is a poor fit and will lead to large anomaly scores for "typical" feature values. The minimum may be used as the anomaly detection score S to enforce that a feature if anomalous if both the Gaussian and the exponential model deem the feature to be anomalous.

In this two parameter example, the CMS data structures 402 may be extended to keep track of the parameters μ and σ. For each item, each bucket in each hash may store the triple of (counter value, μ, σ). During inference, the parameter corresponding to the hash-function that has been updated in training the least number of times (the CMS lookup). During training, all K sets of parameters may be updated. For example, μ and σ may be updated using a simple weighted average of:

$$\text{updated-parameter} \leftarrow (1 - \text{WEIGHT}) * \text{old-parameter} + \text{WEIGHT} * \text{new-feature-value}$$

where the update parameter $$\text{WEIGHT} = \min\left(\frac{1}{\text{count}}, 10 - 4\right).$$

The interpretation is that the new mean value is the average of the past 10^4 observed feature values. Similarly the update works for the variance where it is the empirical variance of the past 10^4 observed feature values.

Figure 4C:
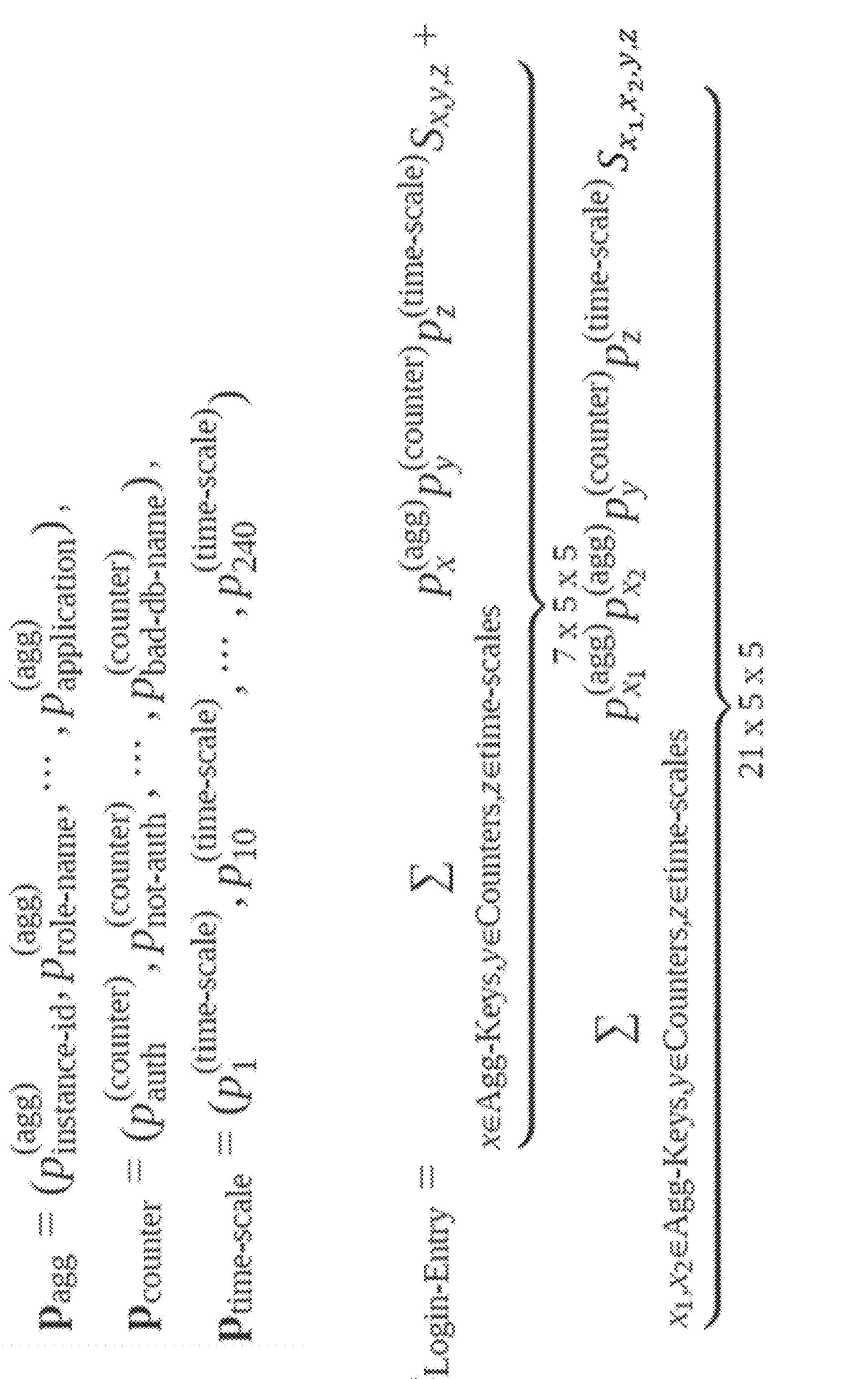
FIG. 4C depicts an example technique that may be used to combine anomaly scores for different features, in accordance with various aspects of the present disclosure.

FIG. 4C depicts an example technique that may be used to combine anomaly scores for different features, in accordance with various aspects of the present disclosure. The goal for aggregating the anomaly detection scores is to combine the different 28×5×5 anomaly detection scores (per-feature) to generate a single aggregated anomaly detection score that determines the relative anomality of the given login event (e.g., login event 108*b*).

For aggregation, three different probability distributions are stored in memory-a first probability distribution for the aggregation keys $$p_{agg} = \left(p^{(agg)}_{instance-id}, p^{(agg)}_{role-name}, \ldots p^{(agg)}_{application}\right),$$

a second probability distribution for the counters $$p_{counter} = \left(p^{(counter)}_{auth}, p^{(counter)}_{not-auth}, \ldots p^{(counter)}_{bad-db-name}\right),$$

and a third probability distribution for the different time scales $$p_{time-scale} = \left(p^{(time-scale)}_{1}, p^{(time-scale)}_{10}, \ldots p^{(time-scale)}_{240}\right).$$

These probability distributions may be different for different databases.

As shown in FIG. 4C, the aggregated anomaly detection score ($S_{Login-Entry}$) may be computed using:

$$S_{Login-Entry} = \underbrace{\sum_{x \in Agg-Keys, y \in Counters, z \in time-scales} P^{(agg)}_{x} P^{(counter}_{y} P^{(time-scale)}_{z} S_z}_{7 \times 5 \times 5} + \underbrace{\sum_{x \in Agg-Keys, y \in Counters, z \in time-scales} P^{(agg)}_{x1} P^{(agg)}_{x2} P^{(counter)}_{y} P^{(time-scale)}_{z} S_{x1,x2,y,z}}_{21 \times 5 \times 5}$$

The above computation linearly combines the anomaly detection scores from all features for the relevant database. Given the selected counters, more anomalous feature values (e.g., anomaly detection scores for individual features), leads to a higher aggregated anomaly detection score $S_{Login-Entry}$.

Multiplication of the probabilities captures the fact that if an aggregation key or counter has low importance (for determining relative anomality), then all features in which that aggregation key/counter appears in will have a low weight. An intuition behind multiplying the two aggregation key weights for weighing the pairs of aggregation keys is that this multiplication captures the axiom that a feature having a pair of aggregation keys (e.g., (IP_address, auth_method) being anomalous must have lower weight than the corresponding single aggregation key features (i.e., a lower weight than just IP_address being anomalous or auth_method being anomalous).

FIG. 4D depicts an unsupervised machine learning technique that may be used to dynamically update weights of the various feature values according to prior knowledge about the database and current usage patterns of the database. The probability functions described above in reference to FIG. 4C may be re-parameterized using a Softmax function to determine the parameters:

$$w_{agg} = \left(w^{(agg)}_{instance-id}, w^{(agg)}_{role-name}, \ldots w^{(agg)}_{application}\right),$$

$$w_{counter} = \left(w^{(counter)}_{auth}, w^{(counter)}_{not-auth}, \ldots w^{(counter)}_{bad-db-name}\right)$$

$$w_{time-scale} = \left(w^{(time-scale)}_{1}, w^{(time-scale)}_{10}, \ldots w^{(time-scale)}_{240}\right)$$

Such that $$p^{(agg)}_{instance-id} = Softmax(w_{agg})_{instance-id}$$

(and similarly for other features). The parameters may be learned by minimizing the loss function 440.

$$w^*_{agg}, w^*_{counter}, w^*_{time-scale} = \arg_{w^*_{agg}, w^*_{counter}, w^*_{time-scale}} \min \sum_{LoginEntry} S_{LoginEntry\ at\ database\ cluster}(w^*_{agg}, w^*_{counter}, w^*_{time-scale}) + \lambda_1 KL(q_{agg} \| \text{Softmax}(w_{agg})) + \lambda_2 KL(q_{counter} \| \text{Softmax}(w_{counter})) + \lambda_3 KL(q_{time-scale} \| \text{Softmax}(w_{time-scale}))$$

The distributions $q_{agg}$' $q_{counter}$' and $q_{time-scale}$' represent prior distributions over the aggregation keys and counters. The goal is to have the distribution of learned weights be close to these prior distributions.

The intuitions for this loss function are as follows:

1) The first term minimizes the average anomaly detection score over all the LoginEntries observed due to the observation that database anomalies are rare by definition.
2) The regularization terms (e.g., the Kullback-Leibler (KL) divergence terms) are added because otherwise the optimal solution will assign all the mass to the feature (e.g., aggregation key, counter, time-scale) having the lowest anomaly score in the training data. The goal of regularization is to keep the learned weights close to the prior distributions.
3) The KL regularization may be kept with the Softmax on the right side so that the learned model does not assign 0 weight to coordinates in which the prior has non-zero weight.

The values for the parameters $\lambda_1$, $\lambda_2$, and $\lambda_3$ may be empirically tuned. The prior distributions may be learned based on historical database usage. Note that since the loss function 440 depicted in FIG. 4D only uses a small number of Softmax functions, the iterative update of the learned weights may be performed even for databases having large numbers of access events (e.g., 100,000s of access events per minute). Using only a few Softmax functions makes the techniques discussed above scalable. By contrast, use of a neural network-based approach would be much slower and computationally intensive.

Online Optimization versus Offline Optimization

The parameters (weights) may be updated online. For example, for each LoginEntry, the anomaly detection score may be computed (as described above) and the gradients may be stored in memory from the forward pass. The gradients may be computed for the forward pass and one step gradient descent may be used to update the weights (during the backward pass).

The techniques described herein have been shown to detect insider data exfiltration threats, password-spraying attacks, and other anomalous database activity over a wide variety of different databases having different security postures, workload patterns, data sensitivity, and SLAs.

Figure 5:
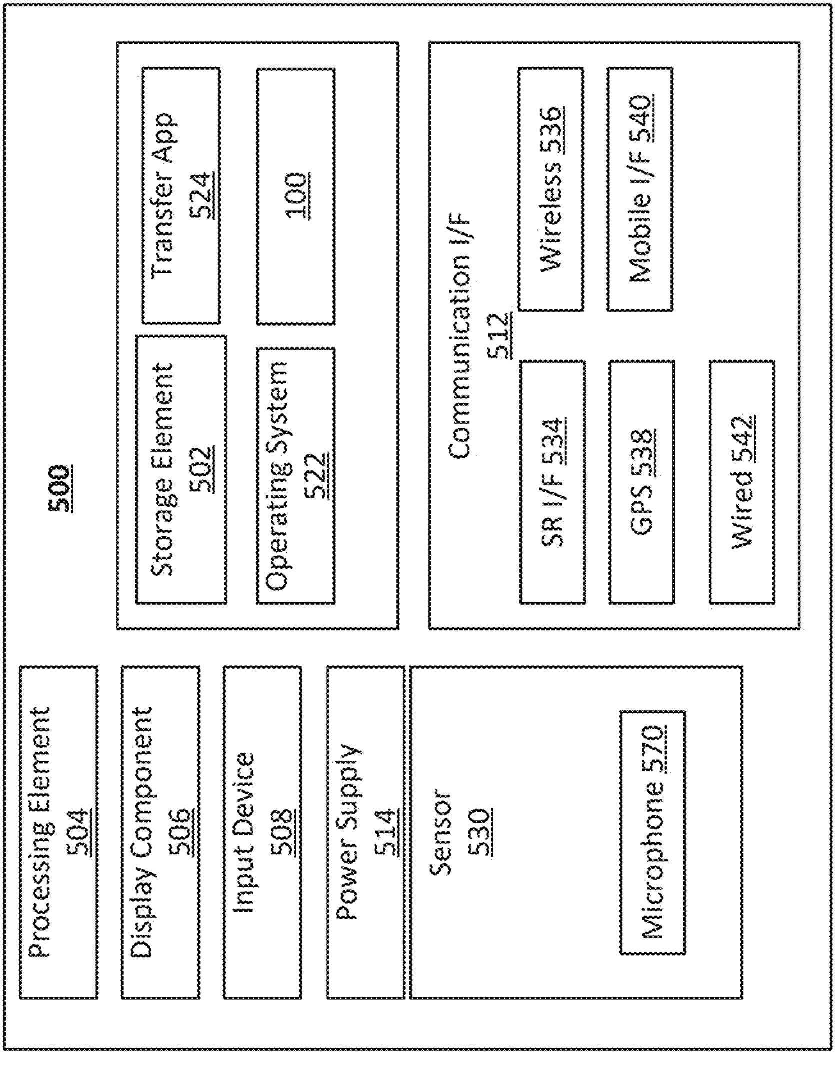
FIG. 5 is a block diagram showing an example architecture of a computing device that may be used in accordance with various embodiments described herein.

FIG. 5 is a block diagram showing an example architecture 500 of a computing device that may be used to implement, at least in part, dynamic threat detection system 100, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learned models, parameters thereof, and/or data representations.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor and/or microphone 570 included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests and/or natural language inputs.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components.

Figure 6:
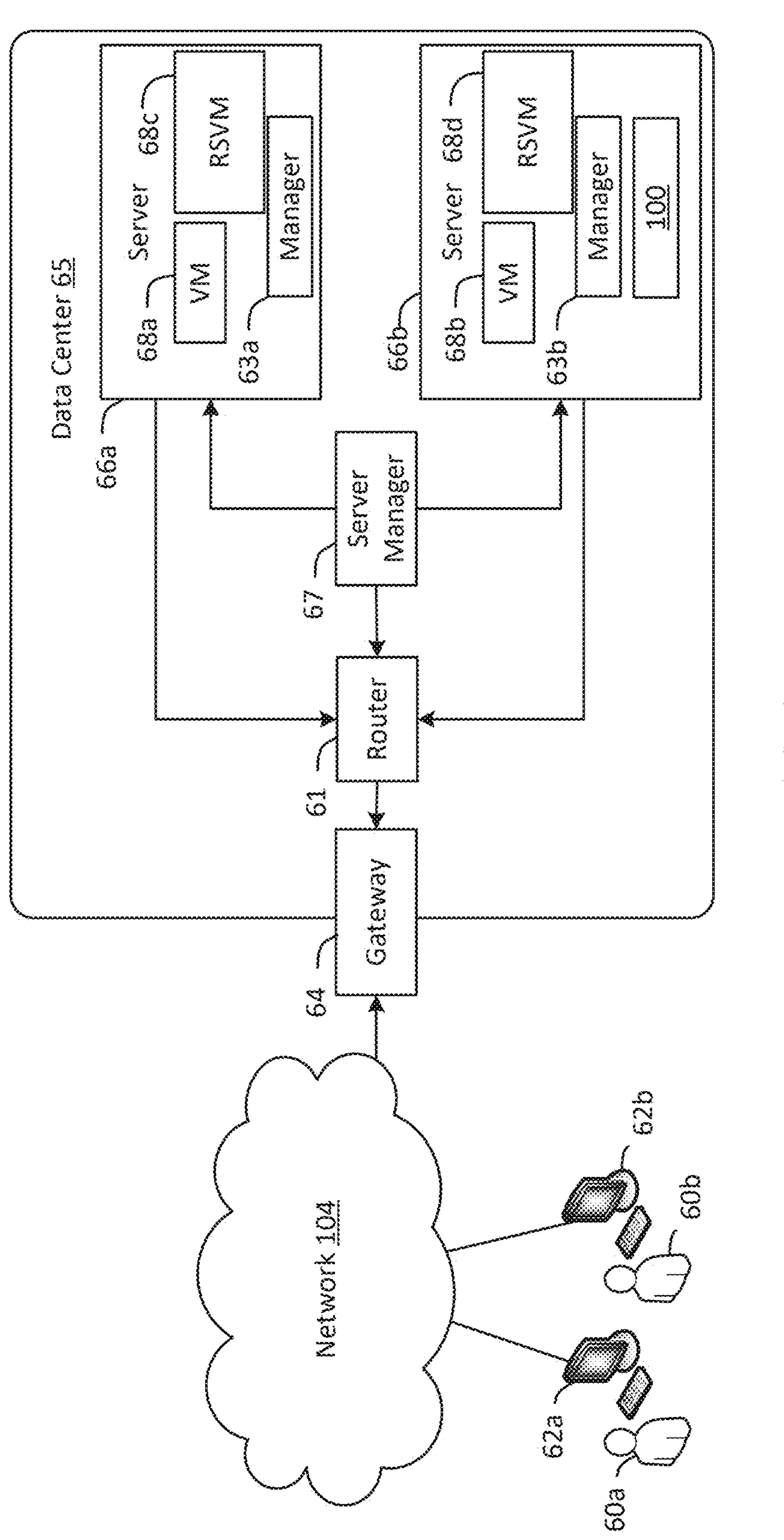
FIG. 6 is a diagram illustrating an example system for sending and providing data that may be used in accordance with the present disclosure.

An example system for implementing a dynamic threat detection system will now be described in detail. In particular, FIG. 6 illustrates an example computing environment in which the embodiments described herein may be implemented. For example, the computing environment of FIG. 6 may be configured to provide anomalous database activity detection as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various adversarial network detection described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68*a-d* (which may be referred herein singularly as virtual machine instance 68 or in the plural as virtual machine instances 68). In at least some examples, server manager 67 may control operation of and/or maintain servers 66. Virtual machine instances 68*c* and 68*d* are rendition switching virtual machine ("RSVM") instances. The RSVM virtual machine instances 68*c* and 68*d* may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines. In various examples, the dynamic threat detection system 100 may be deployed as a cloud-based service. Accordingly, the dynamic threat detection system 100 is depicted as being executed by server 66*b* in FIG. 6. It should be noted that the dynamic threat detection system 100 may be deployed across different physical and/or virtualized compute instances.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62*a* or 62*b* may be a server, a desktop or laptop personal computer, a tablet computer, a wireless telephone, a personal digital assistant (PDA), an e-book reader, a game console, a set-top box, or any other computing device capable of accessing data center 65. User computer 62*a* or 62*b* may connect directly to the Internet (e.g., via a cable modem or a Digital Subscriber Line (DSL)). Although only two user computers 62*a* and 62*b* are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63*a* or 63*b* (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66*a* and 66*b*. Router 61 may also be connected to gateway 64, which is connected to network 104. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66*a* and 66*b*. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
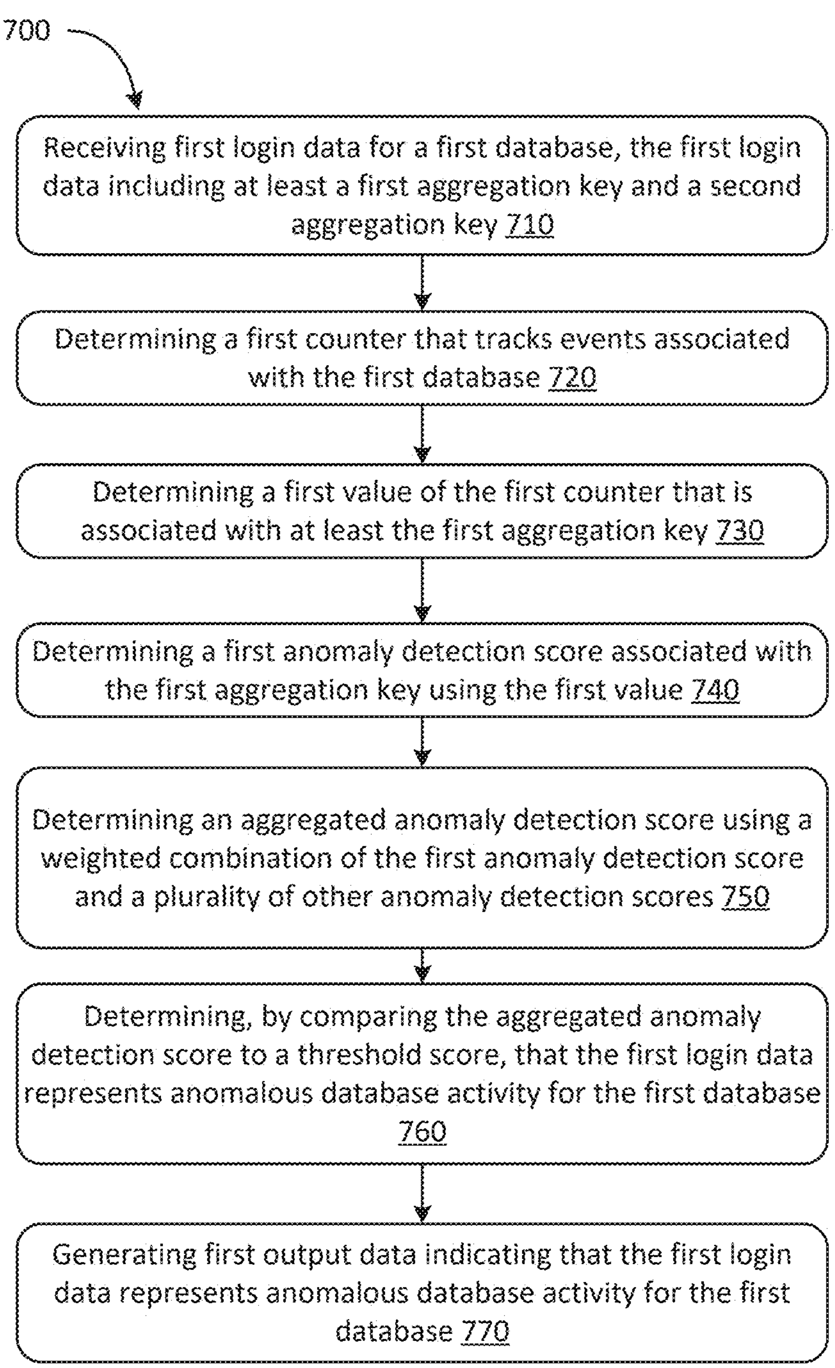
FIG. 7 is a flow diagram illustrating an example process for threat detection for a database, according to various techniques described herein.

FIG. 7 is a flow diagram illustrating an example process 700 for threat detection for a database, according to various techniques described herein. The process 700 of FIG. 7 may be executed by one or more computing devices. The actions of process 700 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 700 may be described above with reference to elements of FIGS. 1-6. Although shown in a particular order, the steps of process 700 may instead be performed in a different order. Additionally, various steps may be performed in parallel in various implementations. Further, some steps may be omitted and/or other steps may be added in accordance with the database threat detection techniques described herein.

Process 700 may begin at action 710, at which first login data may be received. As shown by action 710, the computing device(s) 102 may include various components such as the feature extraction circuit 202 and/or the interconnect 230, or the like, for receiving the first login data. The first login data may represent login data received as part of an event stream associated with a first database. The first login data may include at least a first aggregation key (e.g., an IP address, an application identifier, a role identifier, an auth_method, etc.) and a second aggregation key (e.g., ssl data, instance_resource_id, etc.).

Processing may continue at action 720, at which a first counter that tracks events associated with the first database may be determined. As shown by action 720, the computing device(s) 102 may include various components such as the feature extraction circuit 202, or the like, for determining the first counter for feature extraction. The counter may be, for example, one of the counters 304 described above in reference to FIGS. 3A-3B. As described above, the various counters may track different events related to database logins (e.g., unauthorized login attempts where a bad password or no password is passed in, a total number of failed authentication attempts, a bad database name passed in, a number of corrupted and/or dropped packets, etc.). In general, there may be a positive correlation between counter values and anomality. That is to say, the events tracked by the counters may tend to exhibit greater anomality as the number of events increase (for a given time scale).

Processing may continue at action 730, at which a first value of the first counter that is associated with at least the first aggregation key may be determined. As shown by action 730, the computing device(s) 102 may include various components such as the feature extraction circuit 202, or the like, for determining the first value of the counter that is associated with at least the first aggregation key. For example, a first feature may be the first aggregation key (e.g., either alone or paired with the second aggregation key), paired with the first counter, paired with a selected time scale. In this case, the feature value for this feature may be the value of the first counter for the first aggregation key over the selected time scale. For example, if the first aggregation key is IP_address and the login event is associated with IP_address==IPHASH, the first value may be determined as the first counter value which tracks, for example, the number of failed authentication attempts associated with IP_address==IPHASH over the selected time scale.

Processing may continue at action 740, at which a first anomaly detection score associated with the first aggregation key may be determined using the first value. As shown by action 740, the computing device(s) 102 may include various components such as the anomaly score computation circuit 206, CMS circuit 204, interconnect 230, and/or the feature extraction circuit 202, or the like, for determining the first anomaly detection score associated with the first aggregation key. For example, a maximum feature value over a past time period may be looked up for the relevant feature (e.g., for the same feature for which the feature value was determined at action 730) using, for example, the CMS circuit 204. The interconnect 230 may send the maximum feature value to the anomaly score computation circuit 206. The first anomaly detection score may be the observed feature value (e.g., the feature value determined at action 730) divided by the maximum feature value (e.g., as computed by the anomaly score computation circuit 206). The observed feature value may be received by the anomaly score computation circuit 206 via interconnect 230 from the feature extraction circuit 202. As previously described, the maximum feature value may be retrieved from the CMS data structure 402 (or another probabilistic data structure) for efficiency and/or scalability.

Processing may continue at action 750, at which an aggregated anomaly detection score may be determined using a weighted combination of the first anomaly detection score and a plurality of other anomaly detection scores. As shown by action 750, the computing device(s) 102 may include various components such as the anomaly score aggregation circuit 208, or the like, for determining the aggregated anomaly detection score using a weighted combination of per-feature anomaly detection scores. As described herein, an anomaly detection score may be determined for each feature (for a given login entry event) (e.g., using feature extraction circuit 202). The per-feature anomaly detection scores may be combined as described above in reference to FIG. 4C (e.g., by the anomaly score computation circuit 206). The weights used to determine the probabilities in FIG. 4C may be learned from prior distributions for the database (e.g., iteratively, over time) using the techniques described above in reference to FIG. 4D.

Processing may continue at action 760, at which the aggregated anomaly detection score may be compared to a threshold anomaly detection score (which may be a tunable hyperparameter) to determine if the first login data is anomalous. As shown by action 760, the computing device(s) 102 may include various components such as the anomaly score aggregation circuit 208, or the like, for comparing the aggregated anomaly detection score to the threshold anomaly detection score. If the aggregated anomaly detection score exceeds the threshold, the first login data may be determined to be anomalous for the first database. Processing may continue at action 770, at which first output data may be generated indicating that the first login data represents anomalous database activity for the first database. The first output data may represent an alert. In some examples, the first output data may also programmatically disable access to the first database (e.g., pending an investigation). For example, the first output data may include computer-executable instructions used to block the IP address, user account, application ID, etc., from accessing the first database. It should be noted that the particular actions taken in response to detection of an anomalous login event for a particular database may vary according to the desired implementation.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of database anomaly detection, the method comprising:

receiving first login data for a first database, the first login data comprising a first aggregation key representing an internet protocol (IP) address and a second aggregation key representing an authentication method;

determining a first counter, wherein the first counter tracks failed authorization events;

determining, using the first login data, a value of the first counter for a first time scale, wherein the value of the first counter is associated with a first number of times that the IP address failed authorization during the first time scale;

determining, using the first counter, a first maximum number of times that the IP address failed authorization for the first time scale during a predetermined past time period that is longer than the first time scale;

determining a first anomaly detection score by dividing the first number by the first maximum number;

determining an aggregated anomaly detection score by linearly combining weighted combinations of a plurality of anomaly detection scores, wherein each anomaly detection score of the plurality of anomaly detection scores is associated with a respective feature comprising a unique combination of a counter, at least one aggregation key, and a time scale, wherein the plurality of anomaly detection scores comprises the first anomaly detection score;

determining, by comparing the aggregated anomaly detection score to a threshold anomaly detection score, that the first login data represents anomalous database activity for the first database based on characteristics of the first database; and disabling access to the first database by an account associated with the first login data.

2. The computer-implemented method of claim 1, further comprising:

determining a second counter, wherein the second counter tracks impermissible database access events;

determining, using the first login data, a value of the second counter for a second time scale, wherein the value of the second counter is associated with a second number of impermissible database access events associated with the IP address and the authentication method during the second time scale;

determining, using the second counter, a second maximum number of times that the IP address and the authentication method were both associated with impermissible database access events for the second time scale during the predetermined past time period; and determining a second anomaly detection score by dividing the second number by the second maximum number, wherein the plurality of anomaly detection scores comprises the second anomaly detection score.

3. The computer-implemented method of claim 1, further comprising:

determining a first set of weight values associated with aggregation keys, a second set of weight values associated with counters, and a third set of weight values associated with time scales by minimizing a combination of aggregated feature values associated with historical login data and regularization terms associated with prior distributions of the first database, wherein the determining the aggregated anomaly detection score by linearly combining the weighted combinations of the plurality of anomaly detection scores uses the first set of weight values, the second set of weight values, and the third set of weight values.

4. The computer-implemented method of claim 1, further comprising:

generating a CountMinSketch (CMS) data structure comprising B buckets and using K hash functions;

generating, using each of the K hash functions, a respective hash of the IP address;

determining, for each of the respective hashes, a respective bucket of the B buckets corresponding to the respective hash;

determining a first bucket storing a minimum value from among values stored by the respective buckets; and retrieving the first maximum number from the first bucket.

5. A method comprising:

receiving first login data for a first database, the first login data comprising a first aggregation key and a second aggregation key;

determining a first counter, wherein the first counter tracks first events associated with the first database;

determining a first value of the first counter, wherein the first value is associated with at least the first aggregation key;

determining a first anomaly detection score associated with the first aggregation key using the first value;

determining an aggregated anomaly detection score by combining the first anomaly detection score and a plurality of other anomaly detection scores;

determining, by comparing the aggregated anomaly detection score to a threshold anomaly detection score, that the first login data represents anomalous database activity for the first database; and generating first output data indicating that the first login data represents anomalous database activity for the first database.

6. The method of claim 5, wherein each anomaly detection score of the plurality of other anomaly detection scores is associated with a unique feature comprising a unique combination of a selected counter, a selected aggregation key, and a selected time scale.

7. The method of claim 5, further comprising:

determining the first anomaly detection score based at least in part by dividing the first value of the first counter for a first time scale by a maximum value of the first counter for the first time scale determined over a past time period.

8. The method of claim 7, further comprising:

generating a CountMinSketch (CMS) data structure comprising a first number of buckets and a second number of hash functions;

generating a respective hash of the first aggregation key for each of the second number of hash functions;

determining a respective bucket of the first number of buckets for each of the respective hashes; and determining a smallest value from among values stored in the respective buckets, wherein the maximum value of the first counter corresponds to the smallest value.

9. The method of claim 5, further comprising:

determining the aggregated anomaly detection score using a weighted linear combination of the plurality of other anomaly detection scores and the first anomaly detection score.

10. The method of claim 9, further comprising determining respective weights for the plurality of other anomaly detection scores by minimizing an output of a loss function that calculates an average anomaly detection score for historical login entry data.

11. The method of claim 10, wherein the loss function includes at least a first regularization term and a second regularization term, wherein:

the first regularization term represents a first divergence between a first probability distribution of weights for different aggregation keys and a first prior distribution for the first database over the different aggregation keys, and the second regularization term represents a second divergence between a second probability distribution of weights for different counters and a second prior distribution for the first database over the different counters.

12. The method of claim 5, further comprising selecting the first counter from among a counter that tracks successful authorization events, a counter that tracks failed authorization events, a counter that tracks incorrect database name parameters, and a counter that tracks corrupted and/or dropped packets.

13. The method of claim 5, further comprising selecting the first aggregation key from among a set of aggregation keys comprising an internet protocol address, a role name, an application identifier, and an authentication method.

14. A system comprising:

at least one processor; and non-transitory computer-readable memory storing instructions that, when executed by the at least one processor, are effective to cause the at least one processor to:

receive first login data for a first database, the first login data comprising a first aggregation key and a second aggregation key;

determine a first counter, wherein the first counter tracks first events associated with the first database;

determine a first value of the first counter, wherein the first value is associated with at least the first aggregation key;

determine a first anomaly detection score associated with the first aggregation key using the first value;

determine an aggregated anomaly detection score by combining the first anomaly detection score and a plurality of other anomaly detection scores;

determine, by comparing the aggregated anomaly detection score to a threshold anomaly detection score, that the first login data represents anomalous database activity for the first database; and generate first output data indicating that the first login data represents anomalous database activity for the first database.

15. The system of claim 14, wherein each anomaly detection score of the plurality of other anomaly detection scores is associated with a unique feature comprising a unique combination of a selected counter, a selected aggregation key, and a selected time scale.

16. The system of claim 14, the non-transitory computer-readable memory storing further instructions that, when executed by the at least one processor, are further effective to cause the at least one processor to:

determine the first anomaly detection score based at least in part by dividing the first value of the first counter for a first time scale by a maximum value of the first counter for the first time scale determined over a past time period.

17. The system of claim 16, the non-transitory computer-readable memory storing further instructions that, when executed by the at least one processor, are further effective to cause the at least one processor to:

generate a CountMinSketch (CMS) data structure comprising a first number of buckets and a second number of hash functions;

generate a respective hash of the first aggregation key for each of the second number of hash functions;

determine a respective bucket of the first number of buckets for each of the respective hashes; and determine a smallest value from among values stored in the respective buckets, wherein the maximum value of the first counter corresponds to the smallest value.

18. The system of claim 14, the non-transitory computer-readable memory storing further instructions that, when executed by the at least one processor, are further effective to cause the at least one processor to:

determine the aggregated anomaly detection score using a weighted linear combination of the plurality of other anomaly detection scores and the first anomaly detection score.

19. The system of claim 18, the non-transitory computer-readable memory storing further instructions that, when executed by the at least one processor, are further effective to cause the at least one processor to determine respective weights for a plurality of other feature values by minimizing an output of a loss function that calculates an average anomaly detection score for historical login entry data.

20. The system of claim 19, wherein the loss function includes at least a first regularization term and a second regularization term, wherein:

the first regularization term represents a first divergence between a first probability distribution of weights for different aggregation keys and a first prior distribution for the first database over the different aggregation keys, and the second regularization term represents a second divergence between a second probability distribution of weights for different counters and a second prior distribution for the first database over the different counters.

* * * * *